United States Patent [19]

Pitner

[11] 3,924,912

[45] Dec. 9, 1975

[54] ROLLING BEARING CAPABLE OF FIXING THE AXIAL POSITION OF A MACHINE ELEMENT

[75] Inventor: Alfred Pitner, Paris, France

[73] Assignee: Nadella, France; a part interest

[22] Filed: Dec. 18, 1973

[21] Appl. No.: 425,819

[30] Foreign Application Priority Data
Dec. 22, 1972  France ......................... 72.46068

[52] U.S. Cl. ............................... 308/212; 308/216
[51] Int. Cl.² ......................................... F16C 13/00
[58] Field of Search ........... 308/202, 212, 213, 215, 308/216

[56] References Cited
UNITED STATES PATENTS

| | | | |
|---|---|---|---|
| 2,057,102 | 10/1936 | Lemell | 308/212 |
| 2,749,191 | 6/1956 | Cole et al. | 308/212 |
| 2,969,266 | 1/1961 | Schaeffler | 308/212 |
| 3,462,205 | 8/1969 | Darr et al. | 308/212 |

*Primary Examiner*—M. Henson Wood, Jr.
*Assistant Examiner*—Richard A. Bertsch
*Attorney, Agent, or Firm*—Robert E. Burns; Emmanuel J. Lobato; Bruce L. Adams

[57] ABSTRACT

The bearing has an outer bearing ring surrounding rolling elements which are guided by a cage and are capable of bearing, at one end, against a radial surface of the bearing ring and, at their other end, against an abutment surface of a washer which is for combination with means defining an inner raceway for the rolling elements. The washer is retained axially within the bearing ring by retaining means formed on or connected to the bearing ring at the end opposed to the radial surface.

9 Claims, 3 Drawing Figures

U.S. Patent  Dec. 9, 1975  3,924,912
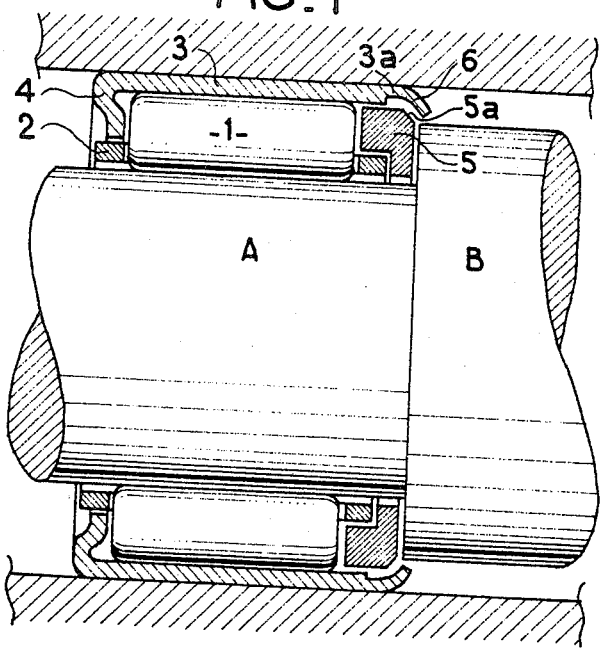
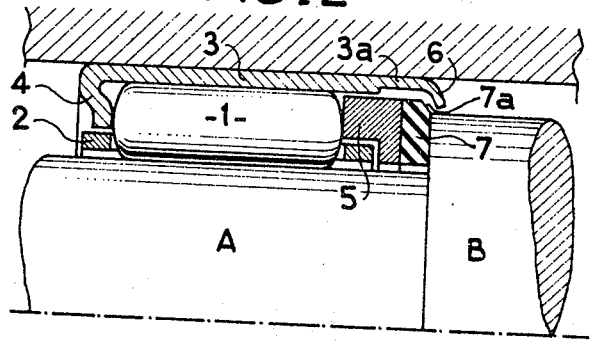
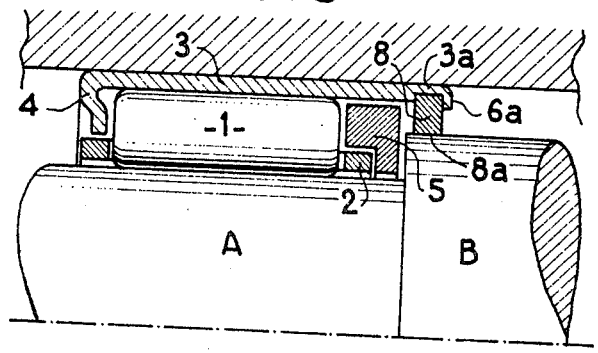

ROLLING BEARING CAPABLE OF FIXING THE AXIAL POSITION OF A MACHINE ELEMENT

The invention relates to a radial rolling bearing comprising needles or rollers which are guided by a cage and are radially interposed between the raceways, at least one of which raceways is a ring, and are capable of bearing at their ends against radial abutment surfaces connected to the respective raceways of the bearing.

This arrangement permits fixing, at least in one direction, the position of a machine element connected to one of the raceways with respect to another machine element.

In a particular known application, a pinion of an automobile vehicle rack and pinion steering mechanism is disposed between two rolling bearings one of which has a ring which is fixed to the case and contains the needles or rollers which are guided by a cage and bear axially at their respective ends against a radial surface of the ring and against a continuous surface connected at least axially to the pinion, the other rolling bearing being constituted by a needle cup the end wall of which cup serves directly or indirectly as an abutment for the end surface of the shaft element.

Although the arrangement just described gives excellent results, it may give rise to difficulties in mass production at high production rates.

In order to facilitate assembly and handling, the present invention provides a rolling bearing comprising rolling elements which are guided by a cage and circulate on at least one cylindrical raceway carried by a ring. These rolling elements bear axially at one end against a radial surface of the ring and at the other against an abutment washer which co-operates with axial retaining means for the washer, so that when handling before assembly, the washer forms with the ring and cage a complete assembly which may be placed in position in a machine element or between two machine elements. Further, the abutment washer protects the rolling elements and the whole of the interior of the rolling bearing from shocks which might result in damage in the course of handling.

The retaining means are advantageously constituted by a continuous or discontinuous flange which is provided on the rolling bearing ring or is part of the ring.

In a rolling bearing according to the invention, which, once mounted, permits fixing a machine element in at least one direction, the abutment washer is maintained in position by the raceway opposed to that on the ring, which precludes in operation a contact with the formed-over edge portion or any other element fixed to or formed on the ring which could produce harmful rubbing, heating and wear. For example, it is possible to bring the washer in contact with the end surface of the teeth of a rack pinion while affording sufficient clearance for good operation of the various relatively moving parts.

Utilization of the rolling bearing according to the invention is found to be particularly judicious when one of the machine elements has a shoulder which cannot be employed directly as an abutment surface for the corresponding end of the rolling elements.

The surface of the abutment washer adjacent the ends of the rolling elements could be hardened so that this surface resists forces exerted thereon and in particular absorbs the axial forces transmitted by the rolling elements.

It is possible to interpose between the abutment washer for the rolling elements and the retaining flange of the ring resiliently yieldable means for achieving a slight prestressing between the two radial abutment surfaces. This arrangement may be adopted to avoid an axial play which would have an adverse effect on good operation of the mechanical assembly in which the rolling bearing according to the invention is placed. Thus a rotor of a low-power electric motor may, for example, be maintained in position by two rolling bearings according to the invention placed at each end of the rotor.

It is also possible to construct a rolling bearing according to the invention with a sealing element engaged between the abutment washer, or the resiliently yieldable means which may co-operate with the washer, and said flange of the ring. In this case, the sealing element may be rendered integral with the flange of the ring and co-operate with the cylindrical large-diameter surface adjacent the shoulder against which the abutment washer bears directly or indirectly. The sealing element retains the rolling elements, their cage, the abutment washer and, if included, the resiliently yieldable means, within the rolling bearing.

Further features and advantages of the invention will be apparent from the ensuing description with reference to the accompanying drawing.

In the drawing:

FIG. 1 is a longitudinal sectional view of a rolling bearing according to the invention;

FIG. 2 is a view similar to FIG. 1 of a modification in which the abutment washer bears against a shoulder through a resiliently yieldable means, and FIG. 3 is a view of a modification of the bearing shown in FIGS. 1 and 2 in which the bearing is provided with a sealing element.

Mounted to roll round a cylindrical surface of small diameter of a shaft A having a portion B of larger diameter defining a shoulder are rolling elements in the form of needles 1 guided by a cage 2. The other raceway for the needles 1 is constituted by a ring 3 which has a radial surface 4 against which the needles 1 bear by one of their planar end surfaces. The other end surface of the needles co-operates with an abutment washer 5 which is axially retained, during handling and mounting, by a radial flange 6 of the ring 3 which is formed over in an end portion 3a of reduced thickness of this ring, this flange extending radially in the region of a chamfer 5a on the washer 5.

In FIG. 1, the abutment washer 5 comes directly in contact with the shoulder B whereas in FIG. 2 a resiliently yieldable ring 7, for example of elastomer, is interposed between the washer and the shoulder. During handling and mounting, neither the resiliently yieldable ring 7 nor the abutment washer 5 is capable of escaping owing to the action of the flange 6 of the ring 3 which radially overlaps all, or a part, of the chamfer 7a on the ring 7.

FIG. 3 shows another embodiment in which the flange 6 extends around, and retains by a nose portion 6a, a sealing ring 8 whose inner edge 8a is in sliding contact with the large-diameter portion B of the shaft A which defines the shoulder. This sealing ring may be constructed from any suitable material, for example felt.

The abutment washer 5 has in all the illustrated embodiments a generally L-shaped section to permit rotation of the cage 2 guiding the needles 1. The diameter of the centre aperture of the washer is greater than the diameter of the inner raceway for the needles and its outside diameter is less than the diameter of the outer raceway so that the washer floats in the radial and axial directions. It is advantageous that the clearance between the washer and the ring exceed that between the washer and the raceway for the needles which is not carried by the ring.

Having now described my invention what I claim as new and desire to secure by Letters Patent is:

1. A radial rolling bearing comprising rolling elements, a bearing ring defining a raceway for rolling elements and defining a radially extending surface adjacent a first end of the ring, a cage co-operative with the rolling elements to guide the rolling elements, a washer for combination with means defining an inner raceway for the rolling elements, the washer defining an abutment surface and disposed inside the ring adjacent a second end of the ring opposed to said first end of the ring and freely movable axially of the ring, and retaining means combined with the ring adjacent said second end for axially retaining the washer within the ring, the rolling elements being capable of axially bearing at one end against the radial surface of the ring and at an opposite end against the abutment surface of the washer, the washer projecting inwardly of the ring radially beyond the retaining means so that although the washer is retained by the retaining means a part of the washer is exposed and capable of receiving an axially-directed thrust from a member outside the bearing ring, whereby said thrust is transmitted to said surface adjacent the first end of the ring through the washer and the rolling elements.

2. A radial rolling bearing as claimed in claim 1, wherein the retaining means comprise a flange on the ring, which flange extends radially inwardly of the ring and is engageable with the washer.

3. A radial rolling bearing as claimed in claim 2, wherein the washer has a reduced portion engageable with the flange.

4. A radial rolling bearing as claimed in claim 2, wherein the washer has a chamfered portion engageable with the flange.

5. A radial rolling bearing as claimed in claim 1, wherein the retaining means comprise a flange on the ring, which flange extends radially inwardly of the ring, the bearing comprising a ring of elastomer which is axially adjacent the abutment washer and capable of maintaining the washer in contact with the corresponding ends of the rolling elements, the flange being capable of axially retaining the ring of elastomer within the bearing ring.

6. A radial rolling bearing as claimed in claim 5, wherein the ring of elastomer has a reduced portion engageable with the flange.

7. A radial rolling bearing as claimed in claim 1, comprising a sealing ring interposed between the washer and the retaining means and capable of being retained by the retaining means, the sealing ring having a cylindrical inner surface for coming into sliding contact with a cylindrical surface of a rotary member.

8. A radial rolling bearing as claimed in claim 7, wherein said retaining means comprise a radially inwardly extending nose portion of the bearing ring.

9. A radial rolling bearing as claimed in claim 7, wherein a resiliently yieldable ring is interposed between the sealing ring and the abutment washer to maintain the washer in contact with the corresponding end of the rolling elements.

* * * * *